US012657967B2

(12) United States Patent
Reiter et al.

(10) Patent No.: US 12,657,967 B2
(45) Date of Patent: Jun. 16, 2026

(54) METHOD FOR RETROFITTING A FEATURE OF A VEHICLE

(71) Applicant: Ford Global Technologies, LLC, Dearborn, MI (US)

(72) Inventors: Matthias Christian Reiter, Aachen (DE); Vincent Jannick Frisch, Cologne (DE)

( * ) Notice: Subject to any disclaimer, the term of this patent is extended or adjusted under 35 U.S.C. 154(b) by 94 days.

(21) Appl. No.: 18/624,617

(22) Filed: Apr. 2, 2024

(65) Prior Publication Data

US 2024/0346858 A1 Oct. 17, 2024

(30) Foreign Application Priority Data

Apr. 13, 2023 (DE) ........................ 102023109370.3

(51) Int. Cl.

| | |
|---|---|
| ***G07C 5/00*** | (2006.01) |
| ***B60R 16/02*** | (2006.01) |
| ***B60R 16/023*** | (2006.01) |
| ***B60W 50/00*** | (2006.01) |
| ***B60W 50/14*** | (2020.01) |
| ***G06Q 30/01*** | (2023.01) |
| ***G06Q 50/40*** | (2024.01) |
| ***G07C 7/00*** | (2006.01) |

(52) U.S. Cl.

CPC ............... *G07C 5/008* (2013.01); *G07C 7/00* (2013.01)

(58) Field of Classification Search

CPC ... G07C 5/008; G07C 7/00; B60W 2050/146; B60W 50/0098; B60W 50/14; G06F 8/60; G06Q 50/40; G06Q 30/01; G06Q 30/0621; G06Q 30/0645; B60R 16/02; B60R 16/0231

USPC ........................................................ 701/31.5

See application file for complete search history.

(56) References Cited

U.S. PATENT DOCUMENTS

| | | | | |
|---|---|---|---|---|
| 2014/0207338 | A1* | 7/2014 | Healey | B60K 35/65 701/1 |
| 2016/0105691 | A1* | 4/2016 | Zucchetta | H04N 21/436 725/82 |
| 2017/0270490 | A1* | 9/2017 | Penilla | G07C 5/0808 |
| 2018/0091930 | A1* | 3/2018 | Jefferies | G07C 9/00571 |
| 2023/0077130 | A1* | 3/2023 | Matsuoka | H04L 67/306 |
| 2023/0385058 | A1* | 11/2023 | Ball | G06F 8/76 |
| 2024/0346858 | A1* | 10/2024 | Reiter | G07C 5/008 |

* cited by examiner

*Primary Examiner* — Tyler D Paige

(74) *Attorney, Agent, or Firm* — Joseph Zane; Eversheds Sutherland (US) LLP

(57) ABSTRACT

A method for retrofitting a feature of a vehicle is described, wherein the vehicle is designed for wireless data transmission and is designed for at least one optional feature, wherein the feature can be retrofitted wirelessly. The method comprises the following steps: entering data for identifying a vehicle using an HMI; receiving the data for identifying a vehicle by method of a data processing device and identifying a vehicle in a database; retrieving from the database and outputting via the HMI at least one optionally retrofittable feature of the identified vehicle; selecting at least one feature of the optionally retrofittable features retrieved; acquiring authorization to use the at least one selected feature; transferring data for retrofitting the at least one selected feature to the vehicle; and retrofitting the at least one selected feature during the next commissioning of the vehicle.

12 Claims, 4 Drawing Sheets

METHOD FOR RETROFITTING A FEATURE OF A VEHICLE

CROSS-REFERENCE TO RELATED APPLICATIONS

The application herein asserts priority to and incorporates by reference German Application No. 102023109370.3, filed on Apr. 13, 2023.

FIELD OF THE INVENTION

The present invention relates to a method for retrofitting an optional feature of a vehicle. The invention also relates to a vehicle, a computer-implemented method, a computer program product, a computer-readable data carrier, and a data carrier signal.

BACKGROUND

Vehicles, in particular motor vehicles, are often designed for wireless data transmission, in particular OTA-enabled (OTA: Over-the-Air). In addition, an internal facility for reconfiguration by communication with the vehicle is usually provided. For example, features can be enabled and/or disabled by the manufacturer. In addition, motor vehicles in particular often have a large number of optional features. These are sometimes not fully implemented in the respective vehicle, for example because a customer has not obtained or not purchased individual options. Possibly for financial reasons, the customer or buyer may have initially economized on one or more optional features when purchasing the vehicle. However, for friends or acquaintances of the vehicle owner who are looking for a good gift for them, it may be a welcome opportunity to purchase corresponding optional features or additional features as a gift for the vehicle owner. In the following, the male pronoun is used as an abbreviation to refer to persons in general.

SUMMARY

The invention is described hereafter in greater detail on the basis of exemplary embodiments and by reference to the attached drawings. Although the invention is illustrated and described in greater detail by means of the preferred exemplary embodiments, the invention is not restricted by the examples disclosed and other variations can be derived therefrom by the person skilled in the art without departing from the scope of protection of the invention.

BRIEF DESCRIPTION OF THE DRAWINGS

The figures are not necessarily accurate in every detail or true to scale and can be shown enlarged or reduced in order to provide a better overview. Therefore, functional details disclosed here are not to be understood in a restrictive sense, but merely as a descriptive basis which offers guidance to the person skilled in the art in this field of technology for applying the present invention in a variety of ways.

As used herein, the term "and/or", when used in a series of two or more elements, means that each of the items listed can either be used alone, or else any combination of two or more of the listed elements can be used. For example, if a combination is described which contains the components A, B and/or C, the combination can contain A alone; B alone; C alone; A and B in combination; A and C in combination; B and C in combination; or A, B, and C in combination.

DETAILED DESCRIPTION

Figure 1:
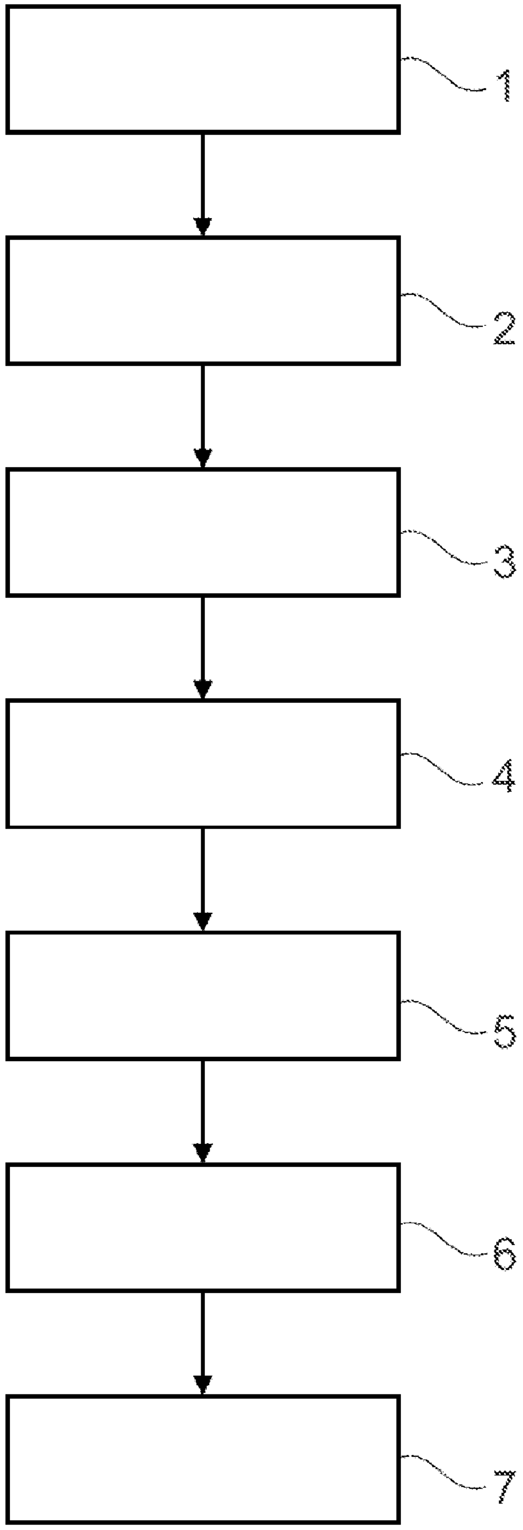
FIG. 1 shows a schematic drawing of a method according to the invention in the form of a flowchart.

It is the object of the present invention to provide an advantageous method for retrofitting a feature of a vehicle, as well as a vehicle, a computer-implemented method, a computer program product, a computer-readable data carrier and a data carrier signal. Within the scope of the present invention, the term retrofitting is understood to mean any provision of an additional feature. Retrofitting therefore also includes the enabling and/or activation of an existing, but e.g. not paid for, feature.

These objects are achieved by a method for retrofitting a feature of a vehicle according to the claims, a vehicle according to the claims, a computer-implemented method according to the claims, a computer program product according to the claims, a computer-readable data carrier according to the claims, and a data carrier signal according to the claims. The dependent claims contain further advantageous embodiments of the invention.

The method according to the invention for retrofitting a feature, for example an additional feature of a vehicle, relates to a vehicle which is designed for wireless data transmission, in particular OTA-enabled, and designed for at least one optional feature, wherein the feature can be retrofitted, in particular can be activated and/or enabled, wirelessly. In other words, the vehicle must have the appropriate hardware to implement the feature. The vehicle can be a motor vehicle, a bicycle or a ship. The motor vehicle can be, e.g. a passenger car, a heavy goods vehicle, a bus, a minibus, a motorcycle or moped.

The method according to the invention comprises the following steps. In a first step, data for identifying a vehicle is entered into a data processing device, for example by a person using a human-machine interface (HMI). The entry can be performed via an application (app) or a website. The data entered for identifying a vehicle is received by a data processing device. A vehicle is then identified in a database. The database may be a database created, maintained and made accessible by the relevant vehicle manufacturer.

In a next step, at least one optionally retrofittable feature of the identified vehicle is retrieved from the database, for example by means of the data processing device, and output, for example displayed, by means of the HMI. In other words, features that have not yet been retrofitted for the specific vehicle, such as features that have not yet been enabled or not yet been activated or not yet downloaded as software, are retrieved from the database and displayed.

At least one feature of the optionally retrofittable features retrieved is then selected, for example by a person or the person already mentioned, using an HMI or the HMI already mentioned. In a next step, authorization to use at least one selected feature is acquired. This can again be carried out by a person using an HMI, preferably the HMI already mentioned. The acquisition can in principle be made against payment or free of charge. For example, a purchase agreement, a rental agreement, leasing agreement, or other usage authorization agreement may be entered into as part of the purchase. The agreement can be concluded, for example, between a person acting as a user and a manufacturer of the vehicle. The previous steps can also be performed using a mobile device, such as a smartphone.

In a further step, data for retrofitting the at least one selected feature is transferred to the vehicle. The transfer of the data comprises the steps of sending the data to the vehicle and/or receiving the data by the vehicle. The data may be data for downloading software for the feature, data for enabling the feature, and/or data for activating the feature. The data transfer can be encrypted and checked accordingly (possibly by checksum etc.), so that the vehicle configuration is error-free. The vehicle can advantageously be equipped with a feature management facility for the data transmission and data processing, in particular for activating features. Here, the option may preferably be provided to allow activation by way of a gift.

In a further step, the at least one selected feature is retrofitted during the next commissioning of the vehicle. This means that the feature is available to a user when the vehicle is next commissioned. The method according to the invention has the advantage that it offers third persons the possibility to give features to owners of a vehicle as a gift, or to purchase features for them. It also offers owners of a vehicle the possibility to retrofit further features in a simple and uncomplicated way at a later time after purchasing a vehicle. The method according to the invention can be carried out by means of a mobile device, e.g. a smartphone.

Examples of features that can be optionally retrofitted in principle include all comfort features, such as seat heating, navigation, lighting functions, e.g. an Intelligent Light Assistant, audio-visual features, general driver assistance features (ADAS features), e.g. a parking assistance feature, an adaptive cruise control (ACC), a traffic sign recognition function, a Cross Traffic Alert feature (CTA feature) or generally Level 3 features. Other options include the retrofitting, in particular enabling, of infotainment content, e.g. mini-games in the infotainment system, or additional designs for the cluster infotainment system, or enabling additional loudspeakers in the vehicle, or enabling various horn sounds.

In an advantageous variant, the at least one selected feature is retrofitted during the next commissioning of the vehicle, wherein the features are enabled and/or activated and/or software is installed. For example, software required for the feature can be downloaded into a vehicle control unit and installed using an app. The enabling and/or activation can also be carried out via an app, in particular by means of a mobile device.

The acquisition of authorization to use the at least one selected feature can include issuing a code. The code can be designed as a QR code and/or an alphanumeric code. This configuration has the advantage that the corresponding code can be sent to the owner or a user of the vehicle in the form of a gift card or by means of an electronic message or an electronic gift card.

In another variant, the acquisition of authorization to use the at least one selected feature may include issuing a message to a user of the vehicle, for example to the owner of the vehicle. Preferably, the message is created individually or is designed to be individualizable. In addition or alternatively, the message can be selected or selectable from a number of templates, e.g. from a database. In other words, after selecting the at least one optional retrofittable feature, an individualized message to a user of the vehicle can be created. This is advantageous in connection with the use of the present method as a gift option, as it allows the gift to be presented or transmitted in an aesthetic and attractive form.

In principle, the message can be in a tangible form, i.e. as a physical element, e.g. in the form of a gift card with a code, and/or in an intangible form, e.g. as an electronic message. The message can be designed and/or be able to be designed as a text message and/or picture message and/or audio message and/or video message and/or light projection in the vehicle and/or light projection on the vehicle. This provides users with a plurality of opportunities to be creative and generate a very personal gift. In particular, the corresponding messages can be created or recorded by the users themselves.

The message can be output by a device of the vehicle as part of the retrofit of the at least one selected feature during the next commissioning of the vehicle. For example, the output can be performed via an HMI and/or a lighting device and/or an audio device and/or a display. Advantageously, in the context of the retrofitting during the next commissioning of the vehicle, a user guide, preferably a quick-start guide, for the retrofitted feature, for example in the form of a tutorial, can be output to a user via an HMI. This has the advantage that the user can be immediately informed about the newly available feature and its application or operation.

In another variant, the retrofit of the at least one selected feature during the next commissioning of the vehicle can comprise entering an authorization code via an HMI. In this case, for example, an enable code or activation code transmitted to the user, in particular a QR code or an alphanumeric code, can be scanned or manually entered via an HMI of the vehicle.

The vehicle according to the invention is designed for wireless data transmission, in particular it can be OTA-enabled. In addition, the vehicle is designed for at least one optional feature, wherein the feature can be retrofitted wirelessly. Furthermore, the vehicle has an HMI and is designed for retrofitting by means of a previously described method according to the invention, i.e. in particular for receiving data for retrofitting at least one optional feature. The vehicle may comprise, for example, a camera for scanning a code, in particular a QR code.

The vehicle according to the invention has the advantages already described. The vehicle can be a motor vehicle, a bicycle, e.g. an e-bike; or a ship, e.g. a yacht. The motor vehicle can be a passenger car, a heavy goods vehicle, a bus, a minibus, a motorcycle or a moped.

The computer-implemented method according to the invention comprises commands, which during the execution of the program by a computer cause said computer to carry out a method according to the invention described above. The computer program product according to the invention comprises commands, which during the execution of the program by a computer cause said computer to carry out a method according to the invention described above. The computer program product according to the invention is stored on the computer-readable data carrier according to the invention. The data carrier signal according to the invention transmits the computer program product according to the invention. The computer-implemented method according to the invention, the computer program product according to the invention, the computer-readable data carrier according to the invention, and the data carrier signal according to the invention have the above-mentioned features and advantages.

FIG. 1 shows a method according to the invention in the form of a flowchart. The method refers to a vehicle, for example a motor vehicle, which is designed for wireless data transmission. The vehicle is also designed for at least one optional, wirelessly retrofittable feature. In step 1, data for identifying a vehicle by means of an HMI is entered by a person, for example in a data processing device. For example, the data can be entered via an app or a website. In step 2, the data for identifying a vehicle is received by a data processing device and a vehicle is identified in the database. In step 3, at least one optional retrofittable feature of the identified vehicle is retrieved from the database and output, preferably displayed, by means of the HMI.

In step 4, at least one of the retrieved features which can be optionally retrofitted is selected, for example by the person mentioned using an HMI, for example the HMI already mentioned. In step 5, authorization to use the at least one selected feature is acquired. This can be carried out by the person using the mentioned HMI. The acquisition may involve a purchase agreement or rental agreement or leasing agreement or another usage agreement being concluded, for example with the vehicle manufacturer or a distribution company or other provider of the desired feature. As part of the process a code, such as an enable code or activation code, may be generated and output. The code can be designed as a QR code and/or an alphanumeric code. In addition, a message to the owner or a user of the vehicle can be created, preferably individually created. The message can be in a tangible form, e.g. as a gift card with a code, and/or in an intangible form, e.g. as an electronic message.

In step 6, data for retrofitting the at least one selected feature is transferred to the vehicle. The corresponding data is sent to and received by the vehicle. In step 7, the at least one selected feature is retrofitted during the next commissioning of the vehicle. The at least one feature can be enabled and/or activated and/or software can be installed.

Figure 2:
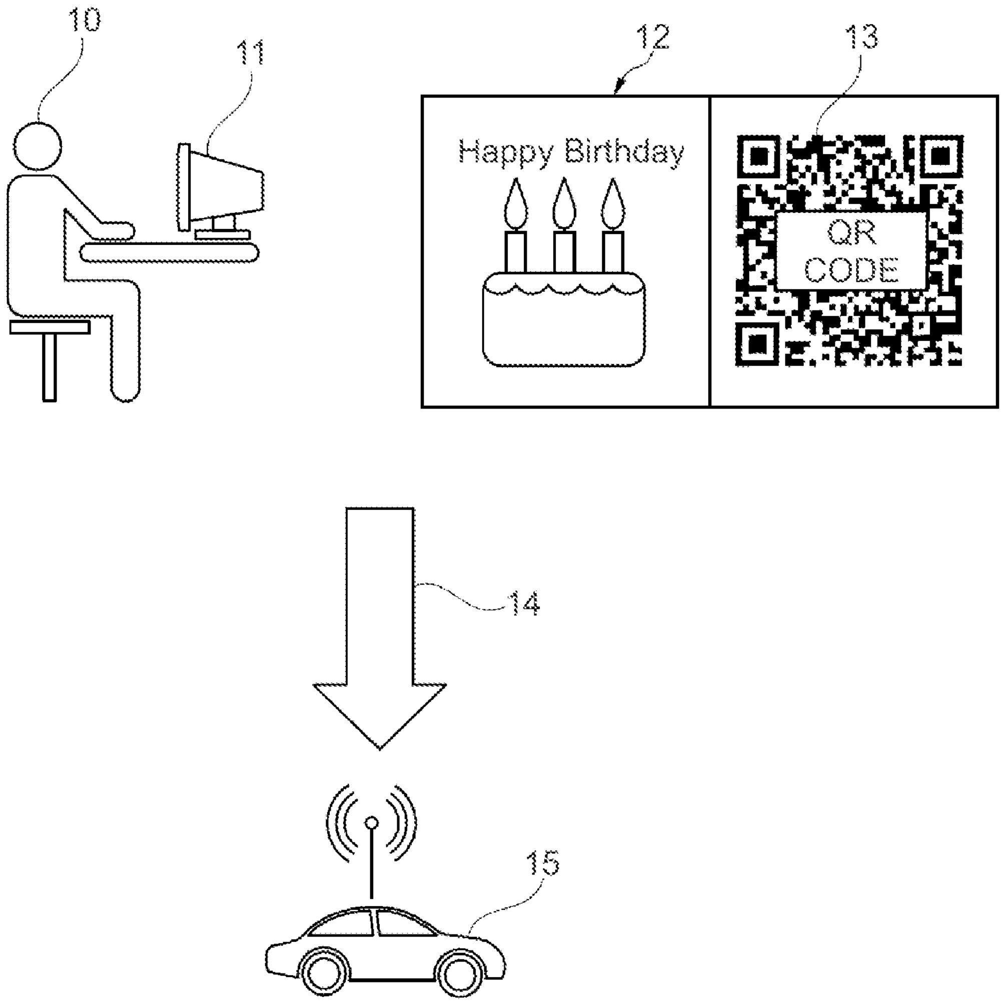
FIG. 2 shows a schematic drawing of a vehicle according to the invention and the embodiment of a first variant of a method according to the invention in a pictographic representation.

FIG. 2 schematically shows the technical concept of the present invention and at the same time, a variant embodiment based on pictograms. The vehicle 15 shown is designed for wireless data transmission and, in particular, is OTA-enabled. A person 10, who has access to data for identifying the vehicle 15, i.e. knows the owner or a user of the vehicle 15, for example, enters the data for identifying the vehicle 15 into an app or a website. A computer 11 or a mobile device can be used for this purpose. The person 10 may be looking for a gift for a user or owner of the vehicle 15 and have the intention to give as a gift a feature that has not yet been retrofitted, for example a feature of the vehicle that has not yet been installed or not yet enabled or not yet activated. In the examples shown in FIGS. 3 and 4, the person 10 has selected an interior lighting assistant and/or a cross traffic alert feature (CTA feature) for this purpose.

As already described in connection with FIG. 1, the person 10 can acquire an optional feature for the vehicle 15 and transmit the data required for retrofitting the optional feature to the vehicle 15 or have the data transmitted. The data transmission is indicated by an arrow with the reference numeral 14. Software can be downloaded to a vehicle control unit and/or an activation code can be transferred.

A code 13 can be generated and issued as part of the acquisition process. This can take place as part of the creation of an individualized greeting card 12. The code 13 can be a QR code or an alphanumeric code. The acquirer or a user of the vehicle 15 can read or scan or enter the code for retrofitting the feature via an app or website. The feature can be enabled and/or activated by entering the code.

Figure 3:
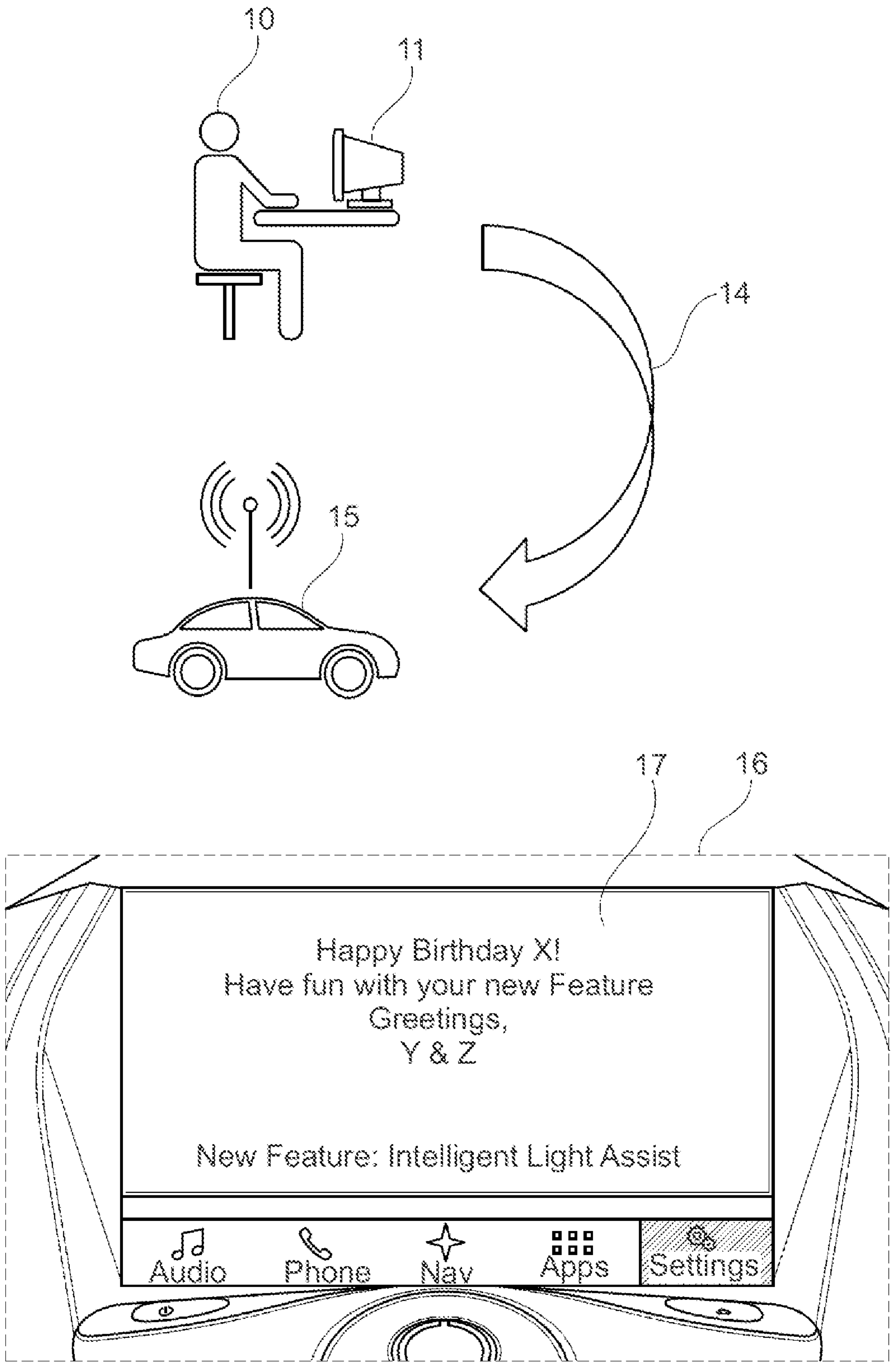
FIG. 3 shows a schematic drawing of a vehicle according to the invention and the embodiment of a second variant of a method according to the invention in a pictographic representation.
Figure 4:
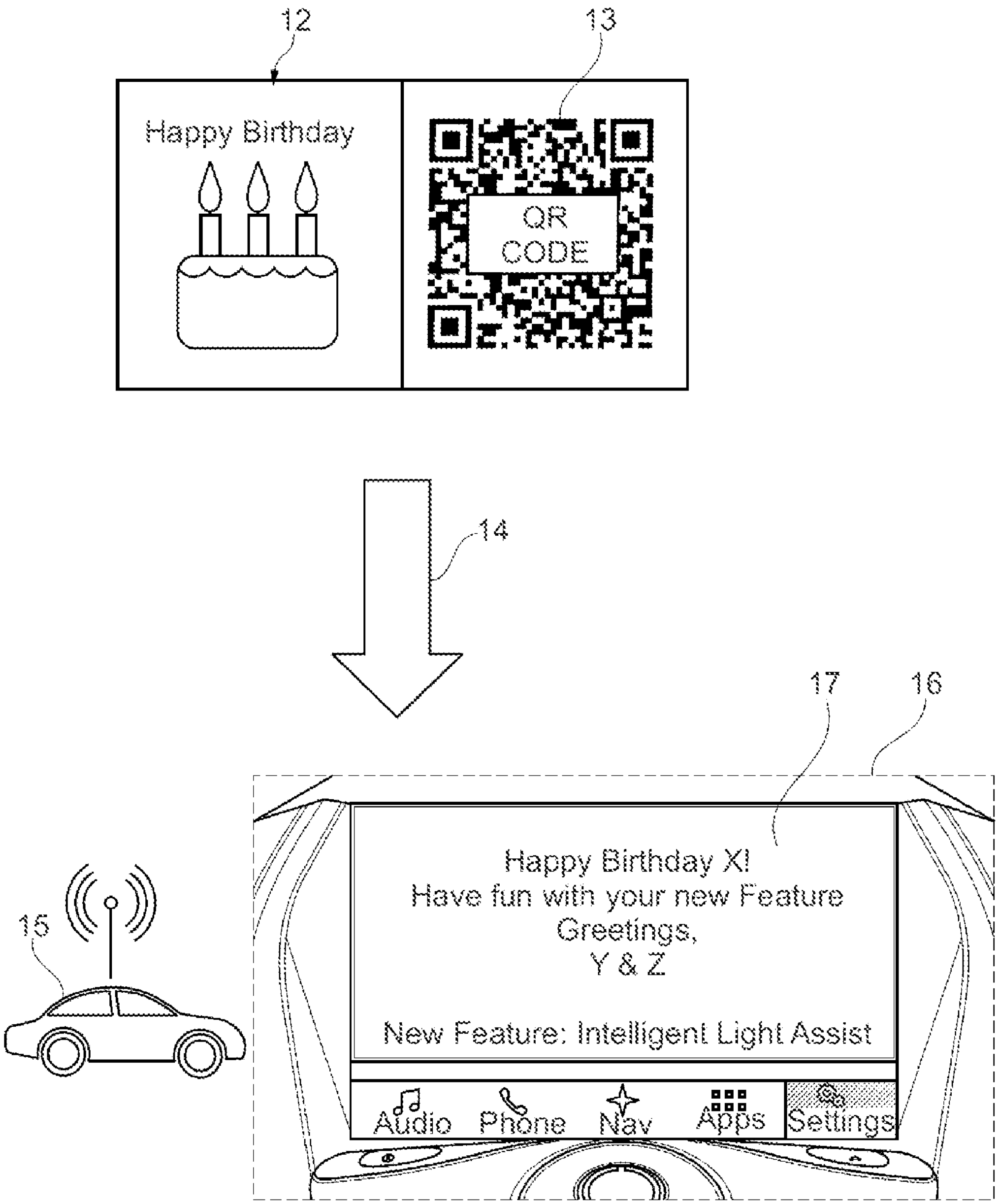
FIG. 4 shows a schematic drawing of a vehicle according to the invention and the embodiment of a third variant of a method according to the invention in a pictographic representation.

In the variant shown in FIG. 3, the code is entered by the person 10 via an app or a website by means of a computer 11 and as a result, the feature is retrofitted, in particular enabled and/or activated. In this case, the entry can be made via the donating or acquiring person, or a code can be sent to the owner or a user of the vehicle by means of an electronic message, for example an electronic postcard. The owner or user can then enter or scan in the appropriate code. In the variant shown in FIG. 4, the QR code 13 of a greeting card 12 is scanned in via an app or a website or an HMI of the vehicle 15.

During the next commissioning of the vehicle 15, an individualized greeting text 17 is displayed to a user via an HMI of the vehicle 15, for example via a display 16. In this context, the new function can be explained and optionally presented via a quick-start guide. In addition, a light show animated by the interior lighting of the vehicle can be performed.

LIST OF REFERENCE SIGNS

1 entering data for identifying a vehicle
2 receiving the data for identifying a vehicle by means of a data processing device and identifying a vehicle in a database
3 retrieving and outputting at least one optionally retrofittable feature of the identified vehicle
4 selecting at least one feature of the optionally retrofittable features retrieved
5 acquiring authorization to use the at least one selected feature
6 transferring data for retrofitting the at least one selected feature to the vehicle
7 retrofitting the at least one selected feature during the next commissioning of the vehicle
10 person
11 computer
12 greeting card
13 QR code
14 data transmission
15 vehicle
16 HMI, display
17 greeting text

We claim:

1. A method for retrofitting a feature of a vehicle, wherein the vehicle is designed for wireless data transmission and is designed for at least one optional feature, wherein the feature can be retrofitted wirelessly, comprising the steps of:

entering data for identifying a vehicle using an HMI (human-machine interface);

receiving the data for identifying a vehicle by means of a data processing device and identifying a vehicle in a database;

retrieving from the database and outputting via the HMI optionally retrofittable features of the identified vehicle that are not currently enabled in the vehicle;

selecting at least one feature of the optionally retrofittable features retrieved;

acquiring authorization to use the at least one selected feature, wherein acquiring the authorization includes issuing an authorization code or a message to a user of the vehicle as confirmation of purchase of the at least one selected feature;

transferring data for retrofitting the at least one selected feature to the vehicle; and retrofitting the at least one selected feature during the next commissioning of the vehicle such that the at least one selected feature is activated or enabled upon said next commissioning.

2. The method according to claim 1, wherein the authorization code is a QR code and/or an alphanumeric code.

3. The method according to claim 1, wherein the message is created individually and/or designed to be individualizable and/or is selected and/or can be selected from a number of templates.

4. The method according to claim 1 wherein the message is in tangible form and/or intangible form.

5. The method according to claim 1, wherein the message is designed and/or can be designed as a text message and/or picture message and/or audio message and/or video message and/or light projection in the vehicle and/or light projection on the vehicle.

6. The method according to claim 1, wherein the message is output by a device of the vehicle as part of the retrofit of the at least one selected feature during the next commissioning of the vehicle.

7. The method according claim 1, wherein a user guide for the retrofitted feature is issued to a user via an HMI as part of the retrofit during the next commissioning of the vehicle.

8. The method according to claim 1, wherein the retrofit of the at least one selected feature during the next commissioning of the vehicle comprises entering an authorization code via an HMI.

9. A vehicle, comprising:

an HMI (human-machine interface); and a computer that causes the vehicle to perform one or more actions comprising:

receiving the data for identifying a vehicle by means of a data processing device and identifying a vehicle in a database;

retrieving from the database and outputting via the HMI optionally retrofittable features of the identified vehicle that are not currently enabled in the vehicle;

selecting at least one feature of the optionally retrofittable features retrieved;

acquiring authorization to use the at least one selected feature, wherein acquiring the authorization includes issuing an code or a message to a user of the vehicle as confirmation of the feature purchase;

transferring data for retrofitting the at least one selected feature to the vehicle; and retrofitting the at least one selected feature during the next commissioning of the vehicle such that the at least one selected feature is activated or enabled upon said next commissioning.

10. The vehicle of claim 9, wherein the code is designed as a QR code and/or alphanumeric code.

11. The vehicle of claim 9, wherein the message is output by a device of the vehicle as part of the retrofit of the at least one selected feature during the next commissioning of the vehicle.

12. A computer program product, comprising commands which during the execution of the commands by a computer, cause said computer to perform the steps of:

entering data for identifying a vehicle using an HMI (human-machine interface);

receiving the data for identifying the vehicle by means of a data processing device and identifying a vehicle in a database;

retrieving from the database and outputting via the HMI optionally retrofittable features of the identified vehicle that are not currently enabled in the vehicle;

selecting at least one feature of the optionally retrofittable features;

acquiring authorization to use the at least one selected feature, wherein acquiring the authorization includes issuing an code or a message to a user of the vehicle as confirmation of the feature purchase;

transferring data for retrofitting the at least one selected feature to the vehicle; and retrofitting the at least one selected feature during the next commissioning of the vehicle such that the at least one selected feature is activated or enabled upon said next commissioning.

* * * * *